Jan. 12, 1960
R. A. FIECHTER
2,920,441
LUBRICATED JEWELED BEARING FOR WATCH MOVEMENTS
AND OTHER PRECISION INSTRUMENTS
Filed April 16, 1954
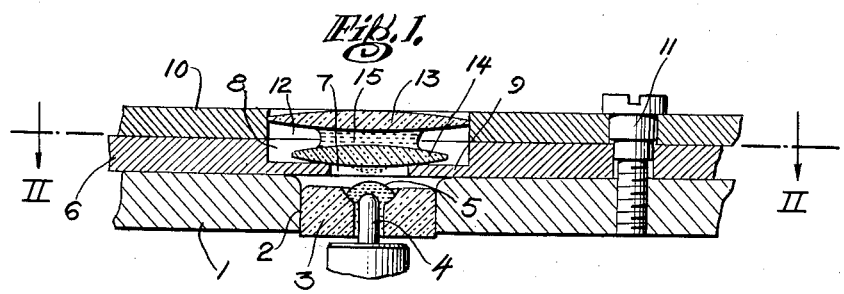
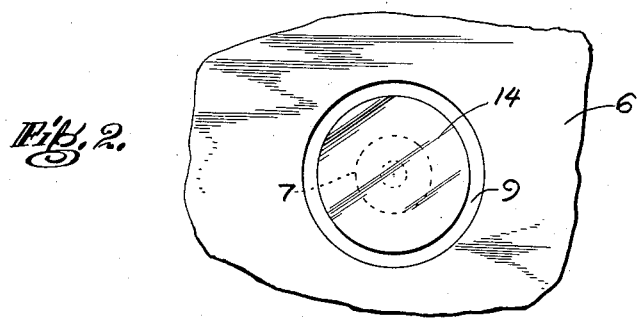
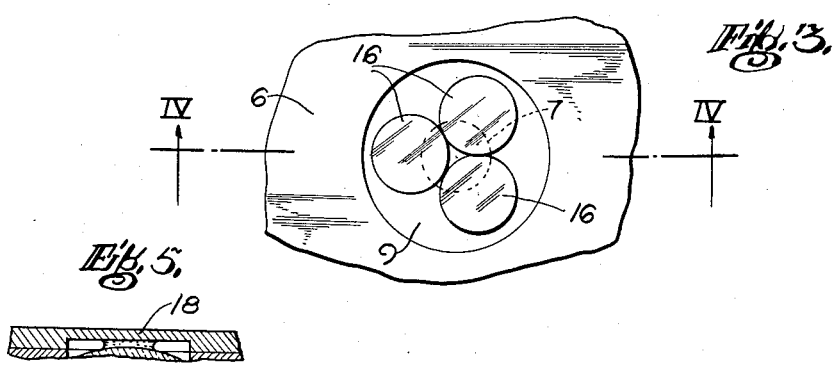
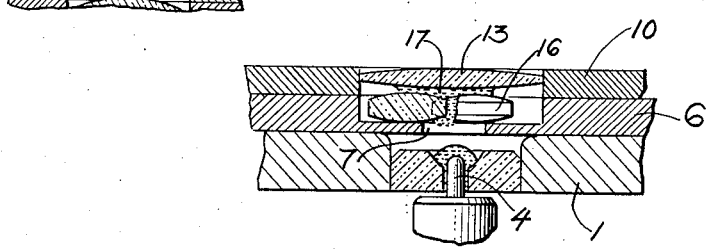
INVENTOR
René A. Fiechter
BY
Mason & Deward
ATTORNEYS

United States Patent Office 2,920,441
Patented Jan. 12, 1960

2,920,441

LUBRICATED JEWELED BEARING FOR WATCH MOVEMENTS AND OTHER PRECISION INSTRUMENTS

René A. Fiechter, Douglaston, N.Y., assignor of one-half to Allen V. Tornek, New York, N.Y.

Application April 16, 1954, Serial No. 423,559

1 Claim. (Cl. 58—140)

This invention relates to a lubricated jeweled bearing for watch movements and other precision instruments.

It is an object of the invention to provide an arrangement of "jewels," in association with the annular jewel constituting the bearing itself, such that additional quantities of lubricant are retained in reserve adjacent the bearing and retard the loss by evaporation of the original lubricant by saturating the available air in the chamber above the original lubricant with oil vapor stirred by the motion of the jewels.

It is a further object of the invention to provide, in addition to the customary end plate, an intermediate or filler plate and a cover plate, in which latter plates is formed a well or reservoir adapted to hold a reserve supply of lubricant at a point adjacent a bearing.

Another object of the invention is to provide at least one "floating" jewel within the well or reservoir in order to keep the reserve lubricant agitated and to feed small quantities thereof to the bearing, as needed.

A still further object is to provide certain improvements in the form, construction and arrangement of the several parts by which the above named and other objects may effectively be attained.

In the operation of watches and other such delicate instruments it is important that journaled rotating parts should operate as long as possible with minimum and constant friction. Lubricated jeweled bearings provide minimum friction, of a constancy which depends on how long it takes the lubricant to become dirty or gummy or to disappear. Factors in the rate of such deterioration include physical conditions of use (e.g., more or less vibration), environmental conditions (e.g., temperature, humidity) and the frequency and rate of change of such conditions. For example, in a hot, humid climate a wrist watch will have to endure not only physical vibration but also rapid changes in temperature of 30° F. or more at erratic intervals as the wearer may enter and leave "air conditioned" areas, or as the watch may be alternately exposed to the sun or sheltered therefrom. Under such conditions, air which is contained in the watch case is stirred by convection currents created by changes in the environmental conditions outside the case, and those currents of air convey specks of dust to the oil and thus hasten the drying out thereof. Moreover, exterior air (normally containing dust and moisture) is likely to be pumped into and out of the watch case, the lubricant loses its effectiveness and the watch, or other instrument, operates inaccurately.

The life of the lubricant (oil) at the bearing can be greatly lengthened by providing an additional oil supply in a closed well or reservoir adjacent the bearing, together with means for keeping said supply agitated so that the atmosphere of the reservoir is constantly saturated with permanently clean oil vapor; the "active" oil in the bearing is thus prevented from becoming dry or dirty, or evaporating. The present invention relates to an improvement in devices of this type and includes the provision of an additional filler plate to facilitate manufacture and assembly of the parts and the provision of one or more "floating" jewels in a specially formed well to retain, condition and feed the reserve supply of oil.

A practical embodiment of the invention is shown in the accompanying drawing, wherein:

Fig. 1 represents a detail sectional view taken in the plane of the axis of a watch gear wheel or the like, on a greatly enlarged scale;

Fig. 2 represents a detail sectional view in a plane perpendicular to the plane of Fig. 1, taken on the line II—II thereof and looking in the direction of the arrows;

Fig. 3 represents a view similar to Fig. 2, but showing a modified form of floating jewels;

Fig. 4 represents a sectional view, similar to Fig. 1, of said modified form, taken on the line IV-IV of Fig. 3, and Fig. 5 is a detail section showing a modified form of cover plate.

Referring to the drawings, there is represented at 1 a small section of an end plate provided with a boring 2 in which is mounted, in the usual manner, an axially drilled jewel bearing 3 for the trunnion 4 of a watch gear pinion, for instance. The bore of the jewel bearing 3 is flared outwardly adjacent the outer end of the trunnion 4 to form a cup in which the active lubricant 5 collects and forms an outwardly convex meniscus. The outer surface of the jewel lies in a plane such that the jewel does not project beyond the flat outer surface of the end plate. The structure described up to this point is conventional.

Fitting closely against the flat outer surface of the plate 1 is a filler plate 6 having an opening 7 coaxial with the trunnion 4, and a cylindrical recess 8 of substantially greater diameter than the opening 7 and extending, for instance, to a depth greater than half the thickness of the plate. The recess 8 is bounded, on the side toward the plate 1, by the annular shoulder 9.

A cover plate 10 lies against the outer surface of the filler plate 6, the plates 1, 6 and 10 being held very tightly together by suitably placed bolts or screws, exemplified by the screw 11 in Fig. 1. In the cover plate 10 is formed an opening 12 having the covering jewel 13 held therein with a force fit; the walls of the opening 12 match the walls of the recess 8 in the filler plate, and the opening thus constitutes an enlargement of said recess, forming a well or reservoir which is in communication only (through the opening 7) with the space adjacent the jewel bearing 3. Enclosed within the well or reservoir is a floating jewel 14, of lenticular form and having a diameter which differs from the diameter of the recess 8 by no more than the radial width of the shoulder 9. The covering jewel is also preferably lenticular, and the axial dimension of the jewels 13, 14 and of the well are such that a body of lubricant 15 can be retained between said jewels in any position of the floating jewel 14, said body being bounded circumferentially by a concave meniscus.

In the alternative form of Figs. 3 and 4, the single floating jewel is replaced by three lenticular jewels 16 of equal size and having a diameter slightly less than the radius of the recess 8. The jewels 16 should have a thickness such that their edges cannot overlap, and should be adapted to lie loosely and movably within the recess. The lubricant 17 may, in this case, assume various irregular shapes on and between the jewels.

When the watch movement is assembled either initially or subsequently (e.g., after cleaning), the operator will supply each jewel bearing with an adequate amount of lubricant 5, and will also place in the well or reservoir (constituted principally by the recess 8) the floating jewel 14 or jewels 16 together with a reserve supply of lubricant 15 or 17, this being done before the plates 1, 6 and 10 are fastened together. After being assembled in the relation shown in Figs. 1 and 4 the parts form a completely enclosed space containing the active body of lubricant 5 and a reserve supply, which latter is effectively kept in good condition by the slight moving around of the floating jewels. During such movement small droplets of the reserve supply may, from time to time, be jarred from the floating jewel or jewels toward the trunnion and will thus replenish the active supply, enabling the watch movement to operate accurately for several times as long a period as in the case of a jewel bearing without reserve.

The provision of the filler plate as a separate element greatly facilitates manufacture, assembly inspection, repair and servicing. In fact, this arrangement makes it possible, if desired, to omit the covering jewel 13 and to substitute for it a continuation of the metal of the cover plate, as shown at 18 in Fig. 5. Such substitution eliminates the possibility of inspection without dis-assembly (as can be done through a transparent covering jewel) but this may be acceptable when it is known that the bearings do not need inspection for long periods of time and when it is such a simple matter to remove the cover plate while the floating jewels rest undisturbed in the recesses of the filter plate. Such a modification is particularly suitable in instruments other than watches, since custom makes it important for watch jewels to be visible.

Surface treatments, as required, may be applied to any of the metal or jewel surfaces to alter (increase or decrease) their compatability with the lubricant to be used, and thus control to some extent the position of said lubricant and ease or difficulty with which it may move from reserve to active positions.

What I claim is:

A jewel bearing assembly comprising, an end plate having a boring formed therein and a flat outer surface, an annular jewel bearing set in said boring and so placed that it does not project beyond the plane of said flat outer surface, a flat filler plate superimposed on said end plate, the filler plate having a recess formed inwardly from its outer surface and an aperture of substantial size from said recess through its inner surface and coaxial with said jewel bearing, the portion of the filler plate remaining between said aperture and the periphery of said recess constituting a shoulder which forms the inward wall of said recess, a flat cover plate superimposed on said filler plate and having a part which completely closes said recess in the outward direction, means for holding said plates tightly together, and at least one substantially lenticular jewel movably enclosed within said recess, in which the recess-closing part of the cover plate is an integral continuation of the cover plate across the recess in the filler plate.

References Cited in the file of this patent

UNITED STATES PATENTS

| | | |
|---|---|---|
| 2,229,428 | Thiebaud | Jan. 21, 1941 |
| 2,272,546 | Colomb | Feb. 10, 1942 |
| 2,478,865 | Fiechter | Aug. 9, 1949 |

FOREIGN PATENTS

| | | |
|---|---|---|
| 281,193 | Switzerland | June 3, 1952 |